United States Patent [19]
Deaver et al.

[11] Patent Number: 6,053,652
[45] Date of Patent: *Apr. 25, 2000

[54] APPARATUS FOR PERFORMING JET PUMP RISER PIPE REPAIRS

[75] Inventors: Gerald A. Deaver; Siamak Bourbour; Don Schrein, all of San Jose; John G. Erbes, Mt. View, all of Calif.

[73] Assignee: General Electric Company, Schnectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/834,315

[22] Filed: Apr. 15, 1997

Related U.S. Application Data
[60] Provisional application No. 60/031,331, Nov. 20, 1996.

[51] Int. Cl.[7] ........................................ F16D 1/00
[52] U.S. Cl. .................. 403/24; 403/211; 403/234; 403/312; 403/DIG. 9; 376/260; 285/373
[58] Field of Search ........................ 403/24, 211, 196, 403/234, 310, 312, 385, 395, 396, 407.1, 409.1, DIG. 9; 285/373, 421; 248/62, 74.1; 376/260

[56] References Cited

U.S. PATENT DOCUMENTS

| | | | |
|---|---|---|---|
| 2,020,102 | 11/1935 | Burton et al. | 403/385 |
| 2,679,413 | 5/1954 | Johnson | 403/385 |
| 3,692,062 | 9/1972 | Dunmire | 138/99 |
| 4,077,730 | 3/1978 | Zaidan | 403/385 |
| 4,133,085 | 1/1979 | Hansson | 24/263 SW |
| 4,240,650 | 12/1980 | Adams | 285/10 |
| 4,381,020 | 4/1983 | Daghe et al. | 138/99 |
| 4,675,149 | 6/1987 | Perry et al. | 376/260 |
| 4,709,729 | 12/1987 | Harrison | 139/99 |
| 4,817,897 | 4/1989 | Kreusel | 403/385 X |
| 5,536,102 | 7/1996 | Kao | 403/409.1 X |
| 5,573,229 | 11/1996 | Lycan | 269/49 |
| 5,609,436 | 3/1997 | Jou | 403/DIG. 9 X |
| 5,701,991 | 12/1997 | Helmetsie | 403/DIG. 9 X |
| 5,727,899 | 3/1998 | Dobrovolny | 403/DIG. 9 X |

Primary Examiner—Daniel P. Stodola
Assistant Examiner—Bruce A. Lev
Attorney, Agent, or Firm—Armstrong Teasdale LLP

[57] ABSTRACT

Apparatus for supporting the lower riser assembly of a jet pump in a reactor pressure vessel (RPV) of a nuclear reactor. In one embodiment of the apparatus, the clamp assembly provides structural rigidity to the lower rise assembly. The clamp assembly includes a lower thermal sleeve clamp and a riser clamp. The lower thermal sleeve clamp is positioned adjacent an interface between the elbow and the thermal sleeve of the jet pump riser pipe assembly. The riser clamp is secured to the riser pipe of the jet pump riser pipe assembly at a location adjacent an interface between the riser pipe and the elbow. The lower thermal sleeve clamp and the riser clamp also are coupled to each other so that as the respective clamps are secured to the lower riser assembly.

9 Claims, 6 Drawing Sheets

FIG. 1

FIG_2

FIG_3

FIG_7a

FIG_7b

APPARATUS FOR PERFORMING JET PUMP RISER PIPE REPAIRS

This application claims the benefit of Provisional Patent Application No. 60/031,331, filed Nov. 20, 1996.

FIELD OF THE INVENTION

This invention relates generally to nuclear reactors and, more particularly, to methods and apparatus for repairing jet pump riser assemblies within a nuclear reactor pressure vessel.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. The top guide includes several openings, and fuel bundles are inserted through the openings and are supported by the core plate.

Water enters the RPV through an inlet nozzle in the RPV sidewall. As is well known, a jet pump riser assembly is coupled to the inlet nozzle and the jet pump riser assembly typically includes, in part, a thermal sleeve, a lower elbow and a riser pipe. The thermal sleeve extends through the inlet nozzle and is welded to one end of the elbow. The other end of the elbow is welded to the riser pipe. The riser pipe is positioned between and extends substantially parallel to the RPV sidewall and the shroud.

During operation, the jet pump assembly directs recirculation flow within the RPV. Accordingly, substantial amounts of water are forced through the jet pump assembly and significant hydraulic forces and vibration are exerted on the jet pump assembly, including on the jet pump assembly elbow. Furthermore, and during operation, a large amount of heat is generated within the RPV, thus placing thermal stress on the jet pump assembly. These hydraulic forces, vibration stresses, and thermal stresses might cause stress corrosion cracking in the riser pipe elbow, and in extreme cases, the riser pipe elbow could separate from the thermal sleeve which is undesirable.

Stress corrosion cracking (SCC) is a known phenomenon occurring in reactor components, such as structural members, piping, fasteners, and welds, exposed to high temperature water. The reactor components are subject to a variety of stresses associated with, e.g., differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

It would be desirable to provide an apparatus which provides support for a jet pump riser elbow. It also would be desirable to provide such an apparatus which is easy to install remotely as a repair in the limited access space available.

SUMMARY OF THE INVENTION

These and other objects are attained by an apparatus which, in one embodiment, includes a clamp assembly for resisting separation by applying compression forces on the thermal sleeve of a jet pump assembly. More particularly, and in accordance with one embodiment of the present invention, the clamp assembly is configured to be secured on the thermal sleeve at the edge of the weld crown at the interface between the thermal sleeve and the elbow and to the riser pipe, and to provide structural rigidity to hold the elbow in position so that it does not separate from the thermal sleeve.

The clamp assembly includes a lower thermal sleeve clamp and a riser clamp. The lower thermal sleeve clamp is positioned proximate to the interface between the thermal sleeve and the elbow. Particularly, the lower thermal sleeve clamp is secured to, e.g., a friction or interference fit, the weld crown of the weld at the interface between the thermal sleeve and the elbow. The riser clamp is secured to the riser pipe at a location adjacent an interface between the riser and the elbow. The lower thermal sleeve clamp and the riser clamp are interconnected so that as the riser clamp is drawn into a tight fit with the riser, the lower thermal sleeve clamp is drawn into a tight fit with the thermal sleeve adjacent to the weld crown of the weld between the thermal sleeve and the lower elbow.

By using the above described clamp assembly, a compression force is placed on the riser pipe and the thermal sleeve. Such clamping assembly provides structural rigidity and facilitates minimizing any leakage of water through any cracks in such welds and piping, and also provides structural support for the riser pipe in the event that the riser pipe separates from the thermal sleeve. In addition, the clamp assembly is easy to install.

DETAILED DESCRIPTION

Figure 1:
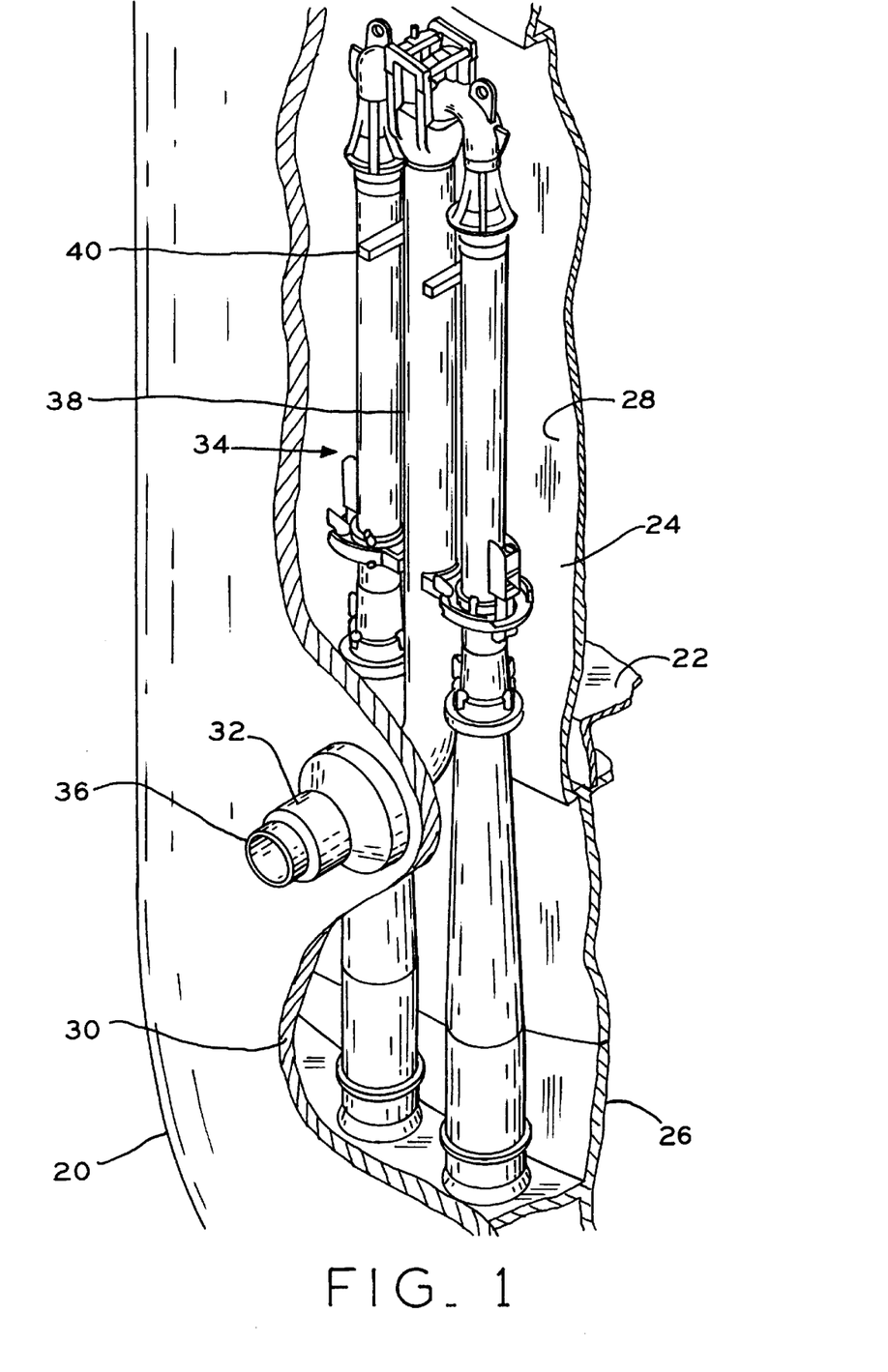
FIG. 1 is a schematic, partial cross-sectional view, with parts cut-away, of a reactor pressure vessel of a boiling water reactor.

FIG. 1 is a schematic, partial cross-sectional view, with parts cut-away, of a reactor pressure vessel (RPV) 20 for a boiling water reactor. RPV 20 has a generally cylindrical shape and is closed at one end by a bottom head and at its other end by removable top head (not shown). A top guide (not shown) is spaced above a core plate 22 within RPV 20. A shroud 24 surrounds core plate 22 and is supported by a shroud support structure 26. An annulus 28 is formed between shroud 24 and sidewall 30 of RPV 20.

An inlet nozzle 32 extends through sidewall 30 of RPV 20 and is coupled to a jet pump assembly 34. Jet pump assembly 34 includes a thermal sleeve 36 which extends through nozzle 32, a lower elbow (only partially visible in FIG. 1), and a riser pipe 38. Thermal sleeve 36 is secured at a first end (not shown) to a first end of the lower elbow. Particularly, the first end of thermal sleeve 36 is welded to the first end of the lower elbow. A second end of the lower elbow is similarly secured, or welded, to one end of riser pipe 38. Riser pipe 38 extends between and substantially parallel to shroud 24 and RPV sidewall 30. A riser brace 40 stabilizes riser pipe 38 within RPV 20. Jet pump assemblies such as assembly 34 are well known in the art, and assembly 34 is illustrated here by way of example only. The present invention can be used with many other jet pump assemblies, and is not limited to use with only assembly 34.

In addition, the present invention is not limited to practice in the boiling water reactor illustrated in FIG. 1, and the present invention could be used in many different reactors having many different alternative configurations. The boiling water reactor of FIG. 1 is illustrated by way of example only and not by way of limitation.

Figure 2:
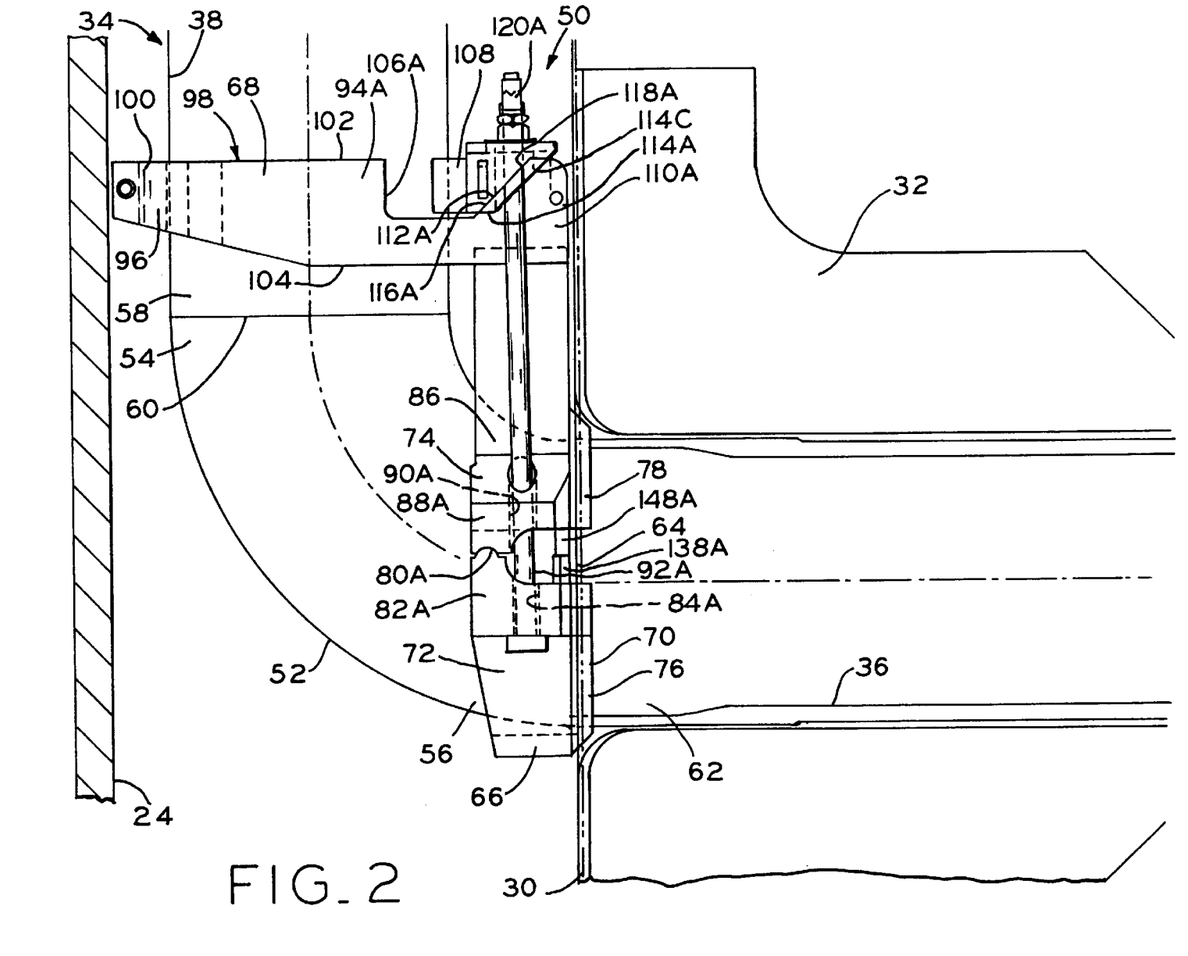
FIG. 2 is a side view of a portion of a jet pump assembly and a clamp assembly in accordance with one embodiment of the present invention.

A clamp assembly illustrated in FIG. 2 may be utilized to provide extra support for riser pipe 38 and the lower elbow. Particularly, FIG. 2 is a side view illustration of jet pump assembly 34 and a clamp assembly 50 in accordance with one embodiment of the present invention. Jet pump assembly 34, as described above, includes thermal sleeve 36, riser pipe 38 and a lower elbow 52. Lower elbow 52 includes a first end 54 and a second end 56. First end 54 of lower elbow 52 is welded to a first end 58 of riser pipe 38 at an interface 60. Second end 56 of lower elbow 52 is welded to a first end 62 of thermal sleeve 36 at an interface 64. As is well known, weld crowns are formed at interfaces 60 and 64.

Clamp assembly 50 includes a lower thermal sleeve clamp 66 and a riser clamp 68. Lower thermal sleeve clamp 66 is configured to be secured to thermal sleeve 36 adjacent to interface 64, and riser clamp 68 is configured to be secured to riser pipe 38 above interface 60. Lower clamp 66 and riser clamp 68 are coupled together. Particularly, lower thermal sleeve clamp 66 is configured to extend substantially vertically, i.e., parallel to RPV sidewall 30, and couple to riser clamp 68, which is configured to extend substantially horizontally, i.e., perpendicular to RPV sidewall 30.

Thermal sleeve 36 extends through lower thermal sleeve clamp 66, and a flange 70 of clamp 66 engages thermal sleeve 36 at the edge of the weld crown at interface 64. Particularly, flange 70 forms a friction fit with thermal sleeve 36 and an interference with the weld crown.

More particularly, lower thermal sleeve clamp 66 includes a lower element 72 and an upper element 74. Lower element 72 and upper element 74 include front faces 76 and 78, respectively, from which flange 70 extends. Lower element 72 has a substantially semicircular geometric shape and includes hinges 80A and 80B at respective lower element ends 82A and 82B (only hinge 80A and end 82A are shown in FIG. 2). Lower element 72 also includes two bolt openings 84A and 84B at respective ends 82A and 82B (only bolt opening 84A is shown in FIG. 2).

Upper element 74 includes a sleeve portion 86 having a substantially semicircular geometric shape with two ends 88A and 88B (only end 88A is shown in FIG. 2), and is configured to pivotally couple to lower element 72 via hinges 80A and 80B. Ends 88A and 88B of upper element 74 include respective bolt openings 90A and 90B (only bolt opening 90A is shown in FIG. 2). Bolt openings 84A and 90A, and 84B and 90B, respectively, are substantially aligned and configured to receive respective bolts 92A and 92B (only bolt 92A is shown in FIG. 2).

Riser clamp 68 is substantially "U" shaped and includes two legs 94A and 94B and a back portion 96 between legs 94A and 94B (only leg 94A and back portion 96 are shown in FIG. 2). Legs 94A and 94B and back portion 96 define a riser cavity 98 configured to receive riser pipe 38. Back portion 96 includes a radial restraint member 100 sized to fit between riser pipe 38 and shroud 24. Riser clamp 68 further includes a top side 102 and a bottom side 104, and each leg 94A and 94B includes a wedge recess 106A and 106B (only wedge recess 106A is shown in FIG. 2). Wedge recesses 106A and 106B are substantially aligned and configured to receive a wedge 108. More particularly, wedges recesses 106A and 106B are adjacent respective ends 110A and 110B of legs 94A and 94B (only leg end 110A is shown in FIG. 2).

As shown in FIG. 2, recesses 106A and 106B are defined, in part, by forward sloping surfaces 112A and 112B which are configured to engage wedge 108 (only forward sloping surface 112A is shown in FIG. 2). Particularly, wedge 108 includes two ends 114A and 114B and an intermediate portion 114C extending between ends 114A and 114B (only end 114A and intermediate portion 114C are shown in FIG. 2). Ends 114A and 114B include sloping surfaces 116A and 116B, respectively, which are configured to abut respective forward sloping surfaces 112A and 112B of riser clamp 68 so that intermediate portion 114C extends between legs 94A and 94B of riser clamp 68 (only sloping surface 116A of wedge end 114A is shown in FIG. 2). Wedge ends 114A and 114B each include a bolt opening 118A and 118B, respectively, therein (only bolt opening 118A is shown in FIG. 2). Bolt openings 118A and 118B extend through sloping surfaces 116A and 116B, respectively, and are configured to receive bolts 92A and 92B, respectively. In addition, bolt openings 118A and 118B are positioned so that when wedge 108 is positioned in recesses 106A and 106B, and wedge ends 114A and 114B abut forward sloping surfaces 112A and 112B of riser clamp 68, bolt openings 118A and 118B are aligned with bolt openings 84A and 90A, and 84B and 90B, respectively, of lower thermal sleeve clamp 66.

Bolts 92A and 92B extend through bolt openings 84A, 90A and 118A, and 84B, 90B and 118B, respectively, to couple riser clamp 68 and lower thermal sleeve clamp 66. Particularly, securing elements 120A and 120B, e.g., nuts and washers, are used to secure bolts 92A and 92B within bolt openings 84A, 90A and 118A, and 84B, 90B and 118B, respectively.

Figure 3:
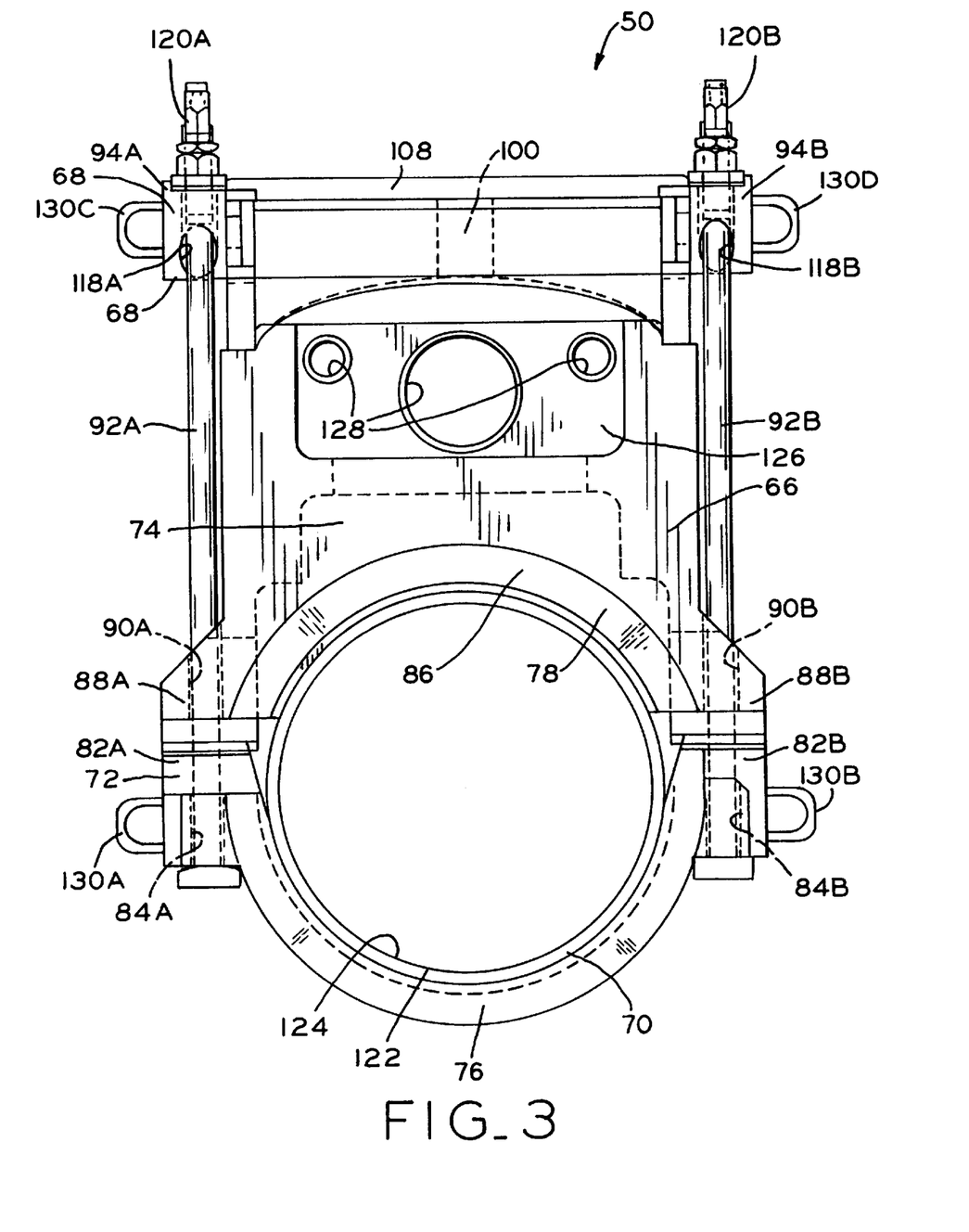
FIG. 3 is a front view of the clamp assembly shown in FIG. 2.

Referring now to FIG. 3, which is a front view of clamp assembly 50, flange 70 of lower thermal sleeve clamp 66 is shown at a perimeter 122 of an opening 124. Upper element 74 of lower thermal sleeve clamp 66 includes a substantially vertical portion 126 extending from semicircular sleeve portion 86. Substantially vertical portion 126 of lower thermal sleeve clamp 66 includes a plurality of apertures 128 therein, which are used for installation, and weight reduction, of clamp assembly 50.

Referring still to FIG. 3, clamp assembly 50 further includes four tooling rings 130A, 130B, 130C and 130D used for installing clamp assembly 50. Tooling rings 130A and 130B are adjacent respective ends 82A and 82B of thermal sleeve clamp lower element 72. Tooling rings 130C and 130D are adjacent respective legs 94A and 94B of riser clamp 68.

Figures 4A, 4B, 5A, 5B:
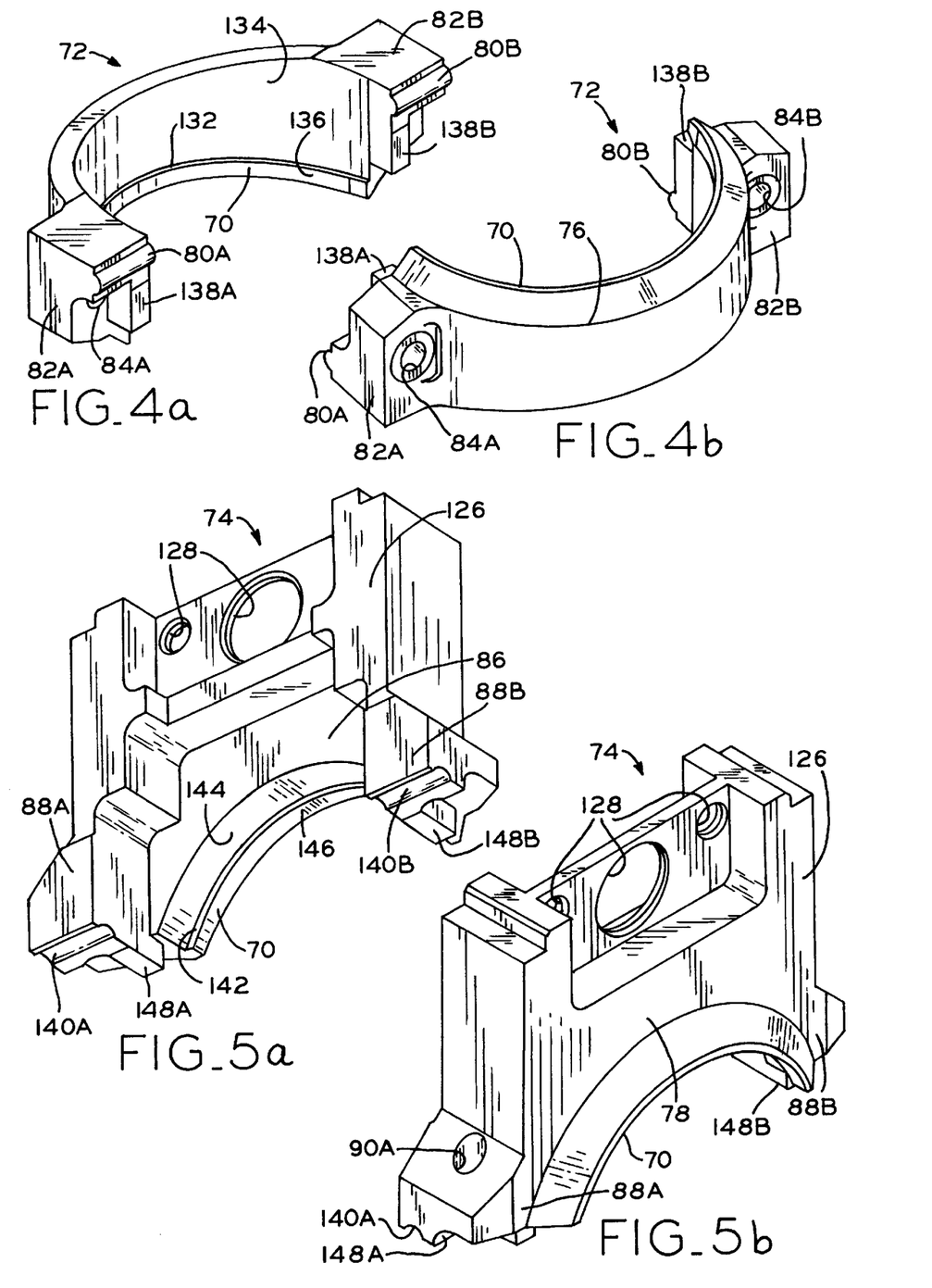
FIGS. 4a and 4b are perspective views of a lower element of the lower thermal sleeve clamp shown in FIG. 2.
FIGS. 5a and 5b are perspective views of an upper element of the lower thermal sleeve clamp shown in FIG. 2.

FIGS. 4a and 4b are perspective views of lower element 72 of lower thermal sleeve clamp 66. As shown, flange 70 extends from front face 76 and forms an engaging surface 132 between an inner perimeter 134 of lower element 74 and an inner perimeter 136 of flange 70. Inner perimeter 136 of flange 70 is configured to engage thermal sleeve 36 so that engaging surface 132 engages the edge of the weld crown at interface 64 between thermal sleeve 36 and lower elbow 52. Lower element 72 further includes two clamp stops 138A and 138B adjacent hinges 80A and 80B, respectively.

FIGS. 5a and 5b are perspective views of upper element 74 of lower thermal sleeve clamp 66. As shown, upper element ends 88A and 88B include hinge receiving channels 140A and 140B, respectively, therein. Each hinge receiving channel 140A and 140B, of course, is configured to receive respective hinge 80A and 80B to pivotally couple upper element 74 and lower element 72 of lower thermal sleeve clamp 66. In addition, and as shown, flange 70 extends from front face 78 and forms an engaging surface 142 between an inner perimeter 144 of upper element 74 and an inner perimeter 146 of flange 70. Inner perimeter 146 of flange 70 is configured to engage thermal sleeve 36 so that engaging surface 142 engages the edge of the weld crown at interface 64 between thermal sleeve 36 and lower elbow 52. Upper element 74 further includes clamp stops 148A and 148B adjacent hinge receiving channels 140A and 140B, respectively. Upper element clamp stops 148A and 148B are configured to abut lower element clamp stops 138A and 138B and thus at least partially restrict pivotal movement of lower element 72 with respect to upper element 74.

Figure 6:
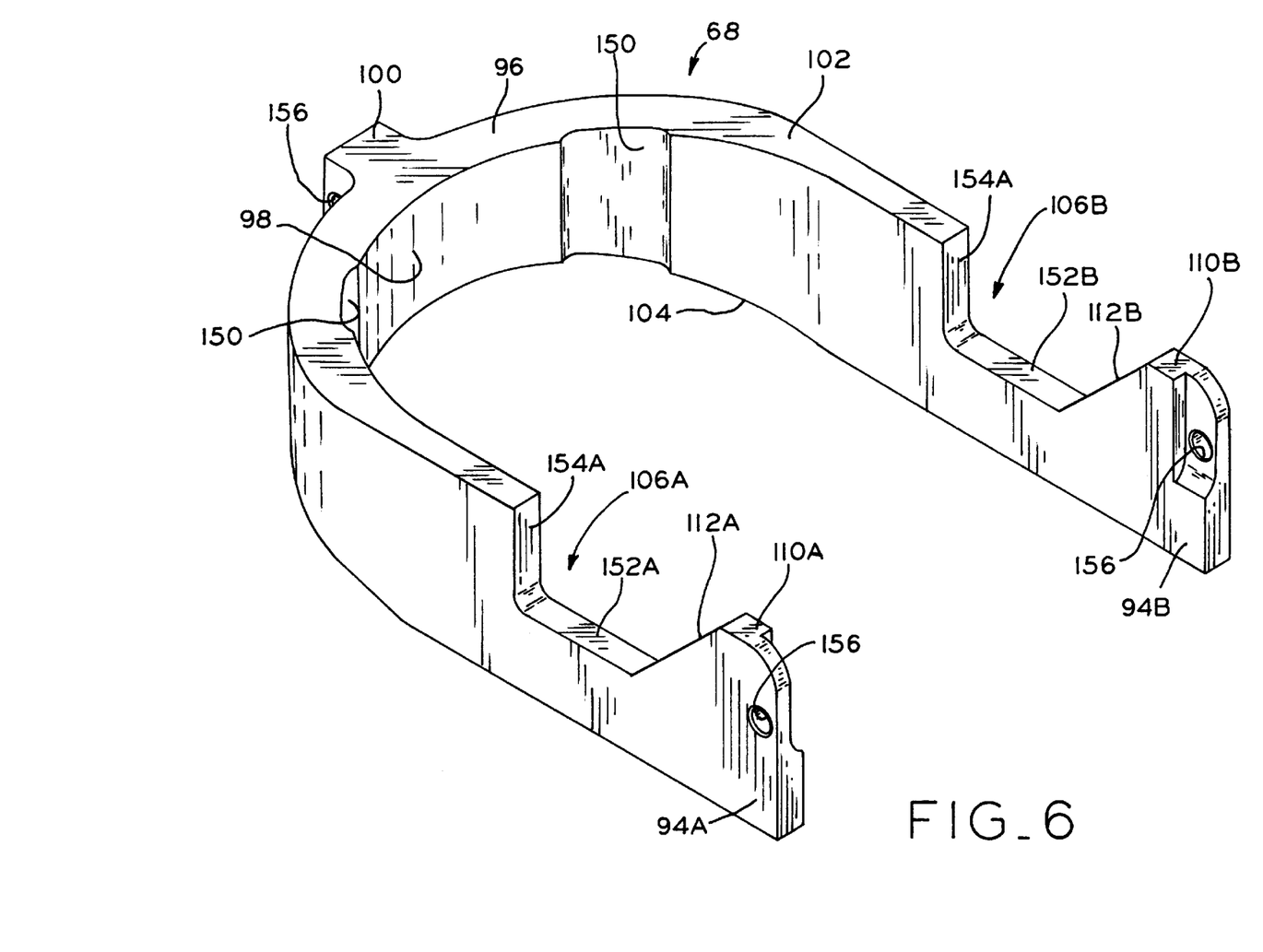
FIG. 6 is a perspective view of the riser clamp shown in FIG. 2.

FIG. 6 is a perspective view of riser clamp 68. Riser clamp 68 includes two riser channels 150 which are about equidistant from riser clamp leg ends 110A and 110B, respectively. Recesses 106A and 106B, in addition to forward sloping surfaces 112A and 112B, include base surfaces 152A and 152B and rear surfaces 154A and 154B, respectively. Base surfaces 152A and 152B are about equidistant from bottom side 104, and rear surfaces 154A and 154B are about equidistant from riser clamp leg ends 110A and 110B, respectively. Rear surfaces 154A and 154B also are spaced sufficiently from forward sloping surfaces 112A and 112B, respectively, so that wedge ends 114A and 114B may be inserted into recesses 106A and 106B, respectively. Riser clamp 68 further includes a plurality of openings 156 which are used for installation, and weight reduction, of clamp assembly 54. Particularly, leg ends 110A and 110B each include one opening 156 and radial restraint member 100 includes one opening.

Figure 7A:
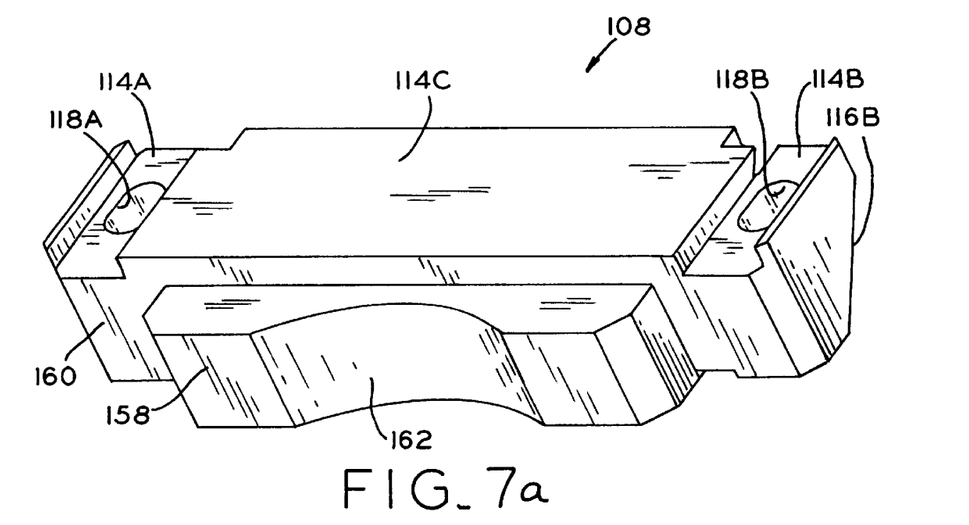
FIGS. 7a and 7b are perspective views of the wedge shown in FIG. 2.
Figure 7B:
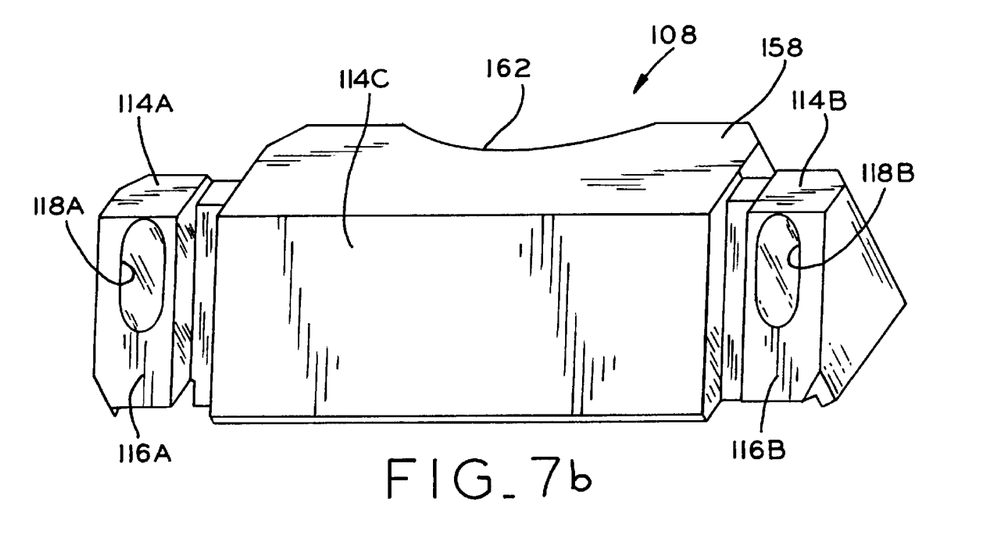

FIGS. 7a and 7b are perspective views of wedge 108. Wedge 108 includes a riser pipe portion 158. Riser pipe portion 158 extends from a back side 160 of wedge 108, and includes a semicircular perimeter 162 that is configured to engage riser pipe 38. Particularly, riser pipe portion 158 is configured so that when sloping surfaces 116A and 116B of wedge 108 engage forward sloping surfaces 112A and 112B of riser clamp 68, riser pipe portion 158 engages riser pipe 38.

To assemble wedge assembly 50, lower thermal sleeve clamp 66 is positioned adjacent interface 64 between thermal sleeve 36 and lower elbow 52 to engage thermal sleeve 36 at the edge of the weld crown at such interface 64. Particularly, and for example, lower element 72 is pivotally couple to upper element 74 of lower thermal sleeve clamp 66. Lower element 72 and upper element 74 of lower thermal sleeve clamp 66 are then rotated with respect to each other via hinges 80A and 80B and positioned so that inner perimeters 136 and 146 of flange 70 engage thermal sleeve 36 and engaging surfaces 132 and 142 engage the edge of the weld crown at interface 64 between thermal sleeve 36 and lower elbow 52. Hinges 80A and 80B facilitate engaging lower thermal sleeve clamp 66 to thermal sleeve 36 without physically contacting RPV sidewall 30. Accordingly, substantially horizontal movement of lower thermal sleeve clamp 66 is restricted by the connection between the weld crown and flange 70. Riser clamp 68 is then positioned against riser pipe 38 adjacent lower interface 60 between lower elbow 52 and riser pipe 38. Particularly, riser clamp 68 is secured to riser pipe 38 at a location above interface 60 so that riser pipe 38 extends through riser pipe cavity 98 and so that legs 94A and 94B extend substantially horizontally and radial restraint member 100 is between riser pipe 38 and shroud 24.

To couple lower thermal sleeve clamp 66 to riser clamp 68, wedge 108 is coupled to riser clamp 68. Particularly, wedge 108 is inserted into riser clamp recesses 106A and 106B so that wedge sloping surfaces 116A and 116B engage riser clamp forward sloping surfaces 112A and 112B, and so that bolt openings 118A and 118B extend substantially vertically and are substantially aligned with bolt openings 84A and 90A, and 84B and 90B of lower thermal sleeve clamp lower element 72 and lower clamp upper element 74, respectively.

Bolt 92A is extended through substantially aligned bolt openings 84A, 90A and 118A and securing element 120A, i.e., a nut and washer, secures bolt 92A within such bolt openings. Similarly, bolt 92B is extended through substantially aligned bolt openings 84B, 90B and 118B and securing element 120B, i.e., a nut and washer, secures bolt 92B within such bolt openings. Accordingly, riser clamp 68 is secured to lower thermal sleeve clamp 66.

Securing elements 120A and 120B are tightened to apply a clamping load to riser clamp 68 and lower thermal sleeve clamp 66. As shown in FIG. 2, bolts 92A and 92B extend substantially vertically through sloping surfaces 116A and 116B of wedge 108. By tightening bolts 92A and 92B, riser clamp 68 is drawn towards bolts 92A and 92B, and clamp 68 is drawn into a tight fit with riser pipe 38. By the relative sliding motion on wedge surfaces 112 and 116, wedge 108 is allowed to slide with respect to bolts 92A and 92B by clearance with slots 118A and 118B. Similarly, tightening bolts 92A and 92B applies both an upward, vertical force on lower thermal sleeve clamp 66.

By simultaneously clamping riser pipe 38 in place with riser clamp 68 and clamping lower thermal sleeve clamp 66 as described above, lower elbow 52 is restrained against vertical and horizontal motion at both interfaces 60 and 64. Horizontal motion is limited by the weld crown at interface 64, and as a redundant feature, the clearance between shroud 24 and radial restraint member 100 also can restrict motion. Vertical motion is limited by the clearance between lower elbow 52 and inner perimeter 144 of upper element 74 of lower clamp 66. Clamp assembly 50 therefore provides support for riser pipe 38 in the event that riser pipe 38 separates from lower elbow 52, and is easy to install.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

We claim:

1. A clamp assembly for securing a thermal sleeve, elbow and riser pipe assembly in a nuclear reactor, wherein the pipe assembly includes an interface between the elbow and the thermal sleeve, the interface having a weld crown, and an interface between the riser pipe and the elbow, said clamp assembly comprising:

a lower thermal sleeve clamp configured to be positioned adjacent the interface between the elbow and the thermal sleeve;

a riser clamp configured to be secured to the riser pipe at a location adjacent the interface between the riser pipe and the elbow, said lower thermal sleeve clamp configured to couple to said riser clamp;

a wedge comprising first and second bolt openings and configured to couple to said riser clamp, said riser clams being substantially "U" shaped and having two legs, each said leg comprising a recess therein, and wherein said wedge is positioned in said recesses so that a portion of said wedge extends between said recesses, said lower thermal sleeve clamp comprising first and second bolt openings, said first and second wedge bolt openings substantially vertically aligned with said respective first and second lower thermal sleeve clamp bolt openings; and two bolts, one of said bolts configured to extend through said first bolt openings and the other of said bolts configured to extend through said second bolt openings.

2. A clamp assembly in accordance with claim 1 wherein said lower thermal sleeve clamp is configured to engage the edge of the weld crown of the interface between the elbow and the thermal sleeve.

3. A clamp assembly in accordance with claim 2 wherein said lower thermal sleeve clamp includes a flange.

4. A clamp assembly in accordance with claim 1 wherein said lower thermal sleeve clamp comprises a lower element and an upper element, said lower element pivotally coupled to said upper element.

5. A clamp assembly in accordance with claim 1 wherein said riser clamp includes a back portion and a restraint member extending therefrom.

6. A clamp assembly for securing a thermal sleeve, elbow and riser pipe assembly in a nuclear reactor, wherein the pipe assembly includes an interface between the elbow and the thermal sleeve, the interface having a weld crown, and an interface between the riser pipe and the elbow, said clamp assembly comprising:

a lower thermal sleeve clamp configured to be secured to the thermal sleeve at a position adjacent the interface between the elbow and the thermal sleeve, said lower thermal sleeve clamp comprising a lower element and an upper element, said lower element pivotably coupled to said upper element;

a riser clamp configured to be secured to the riser pipe at a location adjacent the interface between the riser pipe and the elbow, said lower thermal sleeve clamp configured to couple to said riser clamp; and a wedge configured to couple to said riser clamp and to engage the riser pipe, said riser clamp substantially "U" shaped comprising two legs, each said leg comprising a recess therein, said wedge configured to be positioned in said recesses so that a portion of said wedge extends between said recesses.

7. A clamp assembly in accordance with claim 6 wherein said lower thermal sleeve clamp is configured to engage an edge of the weld crown of the interface between the elbow and the thermal sleeve.

8. A clamp assembly in accordance with claim 1 wherein said lower thermal sleeve clamp includes a flange.

9. A clamp assembly in accordance with claim 6 wherein said wedge comprises first and second bolt openings, and wherein said lower thermal sleeve clamp comprises first and second bolt openings, said first and second wedge bolt openings substantially vertically aligned with said respective first and second lower thermal sleeve clamp bolt openings, and wherein said clamp assembly further comprises two bolts, one of said bolts configured to extend through said first bolt openings and the other of said bolts configured to extend through said second bolt openings.

* * * * *